(12) United States Patent
Wang

(10) Patent No.: US 11,143,359 B1
(45) Date of Patent: Oct. 12, 2021

(54) I-SHAPED TREE SKIRT STAND

(71) Applicant: CENTRESKY CRAFTS(SHANTOU)CO., LTD, Shan Tou (CN)

(72) Inventor: Ruisheng Wang, Guangdong (CN)

( * ) Notice: Subject to any disclaimer, the term of this patent is extended or adjusted under 35 U.S.C. 154(b) by 0 days.

(21) Appl. No.: 16/887,302

(22) Filed: May 29, 2020

(30) Foreign Application Priority Data

May 27, 2020 (CN) .......................... 202010464723.2

(51) Int. Cl.
*F16M 13/02* (2006.01)

(52) U.S. Cl.
CPC ......... *F16M 13/02* (2013.01); *F16M 2200/02* (2013.01); *F16M 2200/028* (2013.01); *F16M 2200/068* (2013.01); *F16M 2200/08* (2013.01)

(58) Field of Classification Search
USPC ............ 248/220.22, 221.11, 222.11, 222.12, 248/223.31; 5/99.1
See application file for complete search history.

(56) References Cited

U.S. PATENT DOCUMENTS

| | | | | |
|---|---|---|---|---|
| 2,011,528 A | * | 8/1935 | Seay | A47C 13/00 256/26 |
| 2,132,988 A | * | 10/1938 | Leibo | A47D 13/065 403/95 |
| 2,810,554 A | * | 10/1957 | Blazey | A47D 13/065 256/25 |
| 6,892,784 B2 | * | 5/2005 | Maas | A47G 5/00 16/319 |
| 2012/0217458 A1 | * | 8/2012 | Rosenboom | B66F 11/042 254/93 R |
| 2014/0210188 A1 | * | 7/2014 | Buttazzoni | B62B 5/0093 280/651 |
| 2017/0342768 A1 | * | 11/2017 | Zwierzykowski | E06B 9/00 |
| 2020/0190844 A1 | * | 6/2020 | Ribner | E04H 15/38 |

\* cited by examiner

*Primary Examiner* — Alfred J Wujciak

(57) ABSTRACT

The present disclosure, pertaining to the technical field of tree skirt stands, relates to an I-shaped tree skirt stand including a plurality of tree skirt units that are engaged with each other. The tree skirt stand unit is formed of an upper connection bar, a lower connection bar, and a vertical fixation bar. Upper and lower ends of the vertical fixation bar are respectively fixedly connected to middle portions of the upper connection bar and the lower connection bar. The upper connection bar, the vertical fixation bar, and the lower connection bar are arranged in an I shape. The tree skirt stand is simple in assembling, the volume of the tree skirt stand in a disassembled state is reduced, and transportation and storage are eased.

7 Claims, 3 Drawing Sheets

I-SHAPED TREE SKIRT STAND

TECHNICAL FIELD

The present disclosure pertains to the technical field of tree skirt stands, and in particular, relates to an I-shaped tree skirt stand.

BACKGROUND

Tree skirts may decorate and protect plants (for example, plants such as Christmas trees that embody the subject of festivals, and plants such as daily household green plants for decoration or the like). Tree skirt stands refers to frames for fixing the tree skirts.

Conventional tree skirt stands are generally connected in series by soft rubber tubes, and the stands are integrally surrounded to a lap by line expansion in the middle of the soft tubes. However, this structure is poor in stability, and may tend to fall apart. In addition, the conventional tree skirt stand is difficult to disassemble, and is inconvenient for storage and transportation.

Accordingly, an I-shaped tree skirt stand is provided to solve the above problems.

SUMMARY

In view of the problems that the tree skirt stand in the related art is difficult to disassemble and is poor in stability, the present disclosure provides an I-shaped tree skirt stand which features strong stability and simple disassembling.

To achieve the above object, the present disclosure employs the following technical solution: an I-shaped tree skirt stand, including a plurality of tree skirt units that are engaged with each other, the tree skirt stand unit being formed of an upper connection bar, a lower connection bar, and a vertical fixation bar, upper and lower ends of the vertical fixation bar being respectively fixedly connected to middle portions of the upper connection bar and the lower connection bar, the upper connection bar, the vertical fixation bar, and the lower connection bar being arranged in an I shape, the upper connection bar and the lower connection bar being both arc bars, two ends of the upper connection bar and the lower connection bar being respectively fixedly connected to an insertion slot and an insertion member, the insertion slot and the insertion member being engaged with each other and fixed to each other, the upper connection bars collaboratively forming an upper fixation ring, the lower connection bars collaboratively forming a lower fixation ring, side walls of the upper connection bar and the lower connection bar being both provided with a tree skirt fixation member.

Preferably, the tree skirt fixation member is a magic tape.

Preferably, the tree skirt fixation member is a hook.

Preferably, the tree skirt fixation member is a magnetic tape.

Preferably, the tree skirt fixation member is a snap.

Preferably, the insertion slot is provided with an engagement hole, and an elastic engagement member is fixedly connected to the insertion member, the elastic engagement member mating with the engagement hole.

Preferably, the upper fixation ring has a circumference that is less than that of the lower fixation ring.

As compared with the related art, the I-shaped tree skirt stand according to the present disclosure has the following merits:

1. By arranging the plurality of tree skirt stand units, under cooperation of the insertion slots and the insertion members, assembling and disassembling of the tree skirt stand are eased, and the volume of the tree skirt stand in the disassembled state is reduced, thereby facilitating transportation and storage.

2. By arranging the circular step-shaped tree skirt stand that is larger at the upper part and smaller at the lower part, under cooperation of the vertical fixation bar, not only the entire structural strength of the tree skirt stand is enhanced, but also the stability of the tree skirt stand is greatly improved, such that the stand may not easily fall out.

3. By arranging the tree skirt fixation member, the fixation of the tree skirt is eased, and the difficulty of deployment and disassembling of the tree skirt is greatly lowered.

Figure 1:
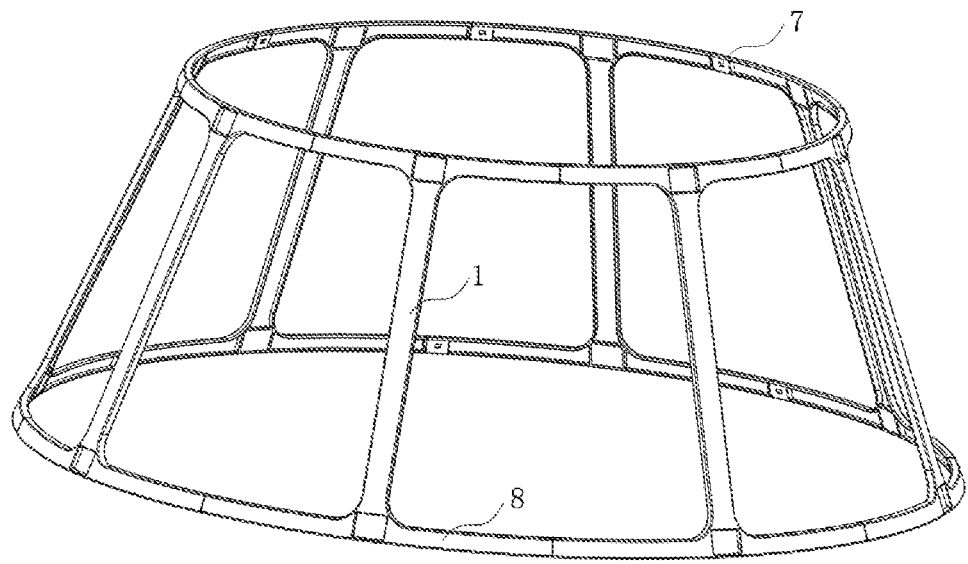
FIG. 1 is a schematic entire structural view of an integral structure of an I-shaped tree skirt stand according to the present disclosure.

Reference numerals and denotations thereof: 1-tree skirt stand unit, 2-upper connection bar, 3-lower connection bar, 4-vertical fixation bar, 5-insertion slot, 6-insertion member, 7-upper fixation ring, 8-lower fixation ring, 9-tree skirt fixation member, 10-engagement hole, and 11-elastic engagement member.

DETAILED DESCRIPTION

The embodiment hereinafter is only intended to illustrate the present disclosure, instead of limiting the scope of the present disclosure.

Embodiment

Figure 2:
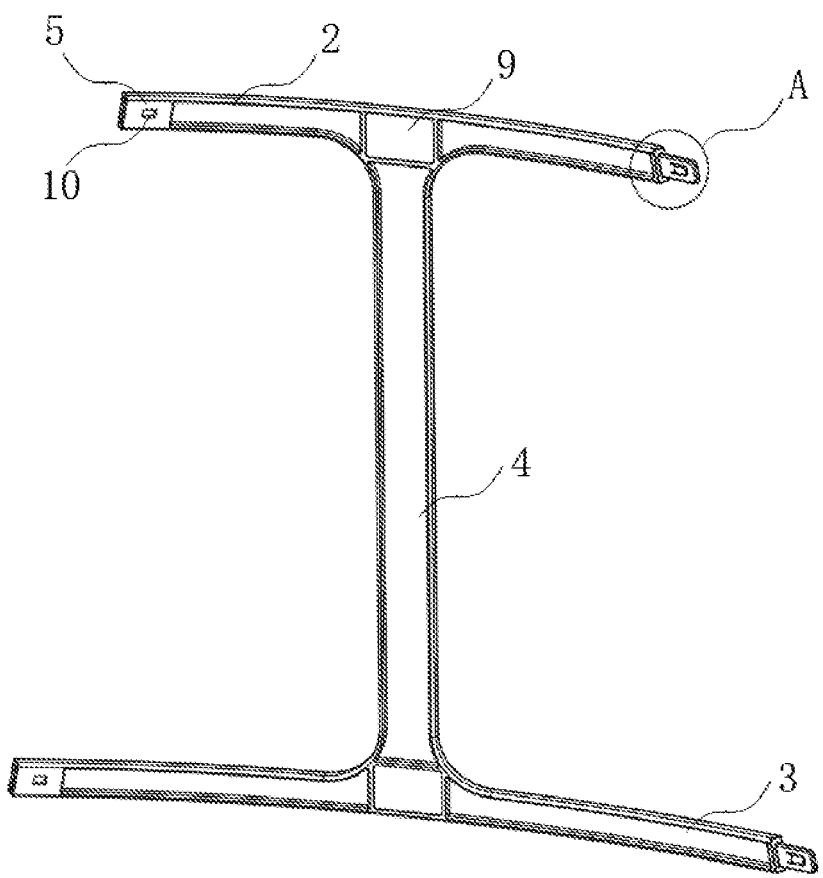
FIG. 2 is a schematic structural view of an inner side wall of a tree skirt stand unit in the I-shaped tree skirt stand according to the present disclosure.
Figure 3:
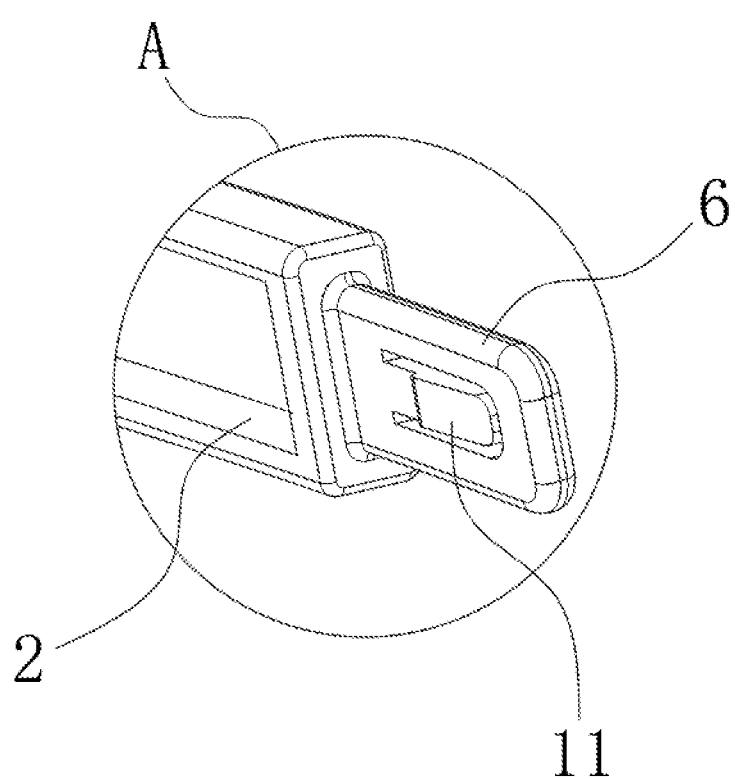
FIG. 3 is a schematic enlarged structural view of A in FIG. 2.
Figure 4:
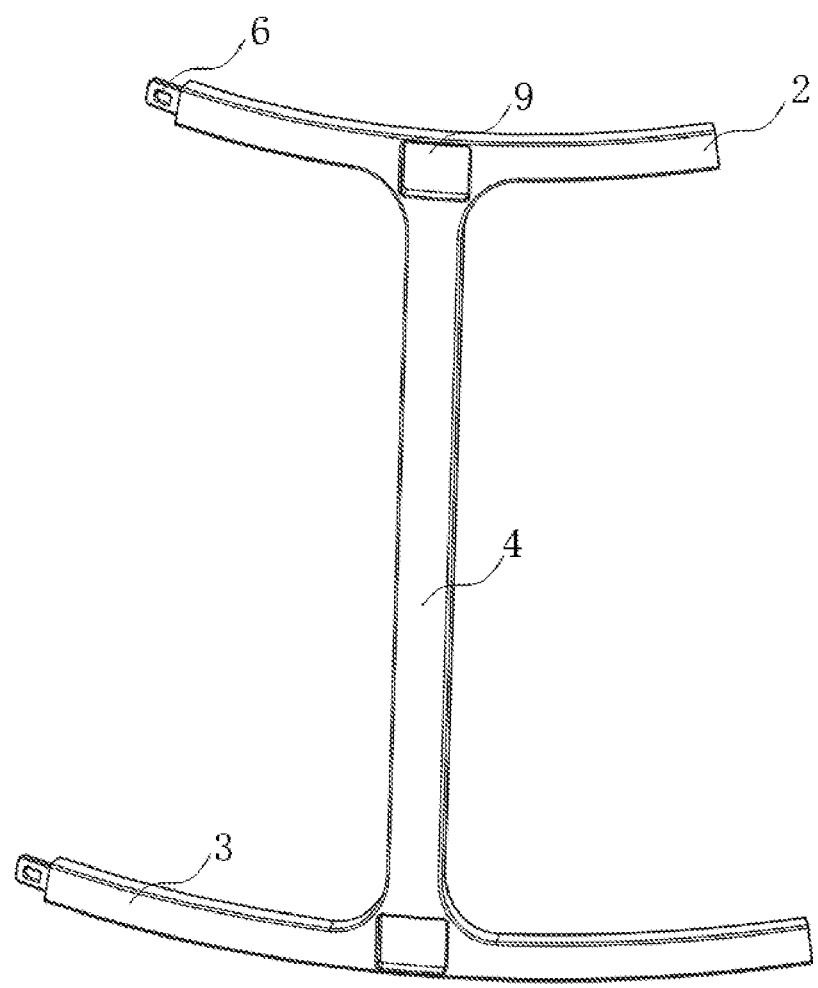
FIG. 4 is a schematic structural view of an outer side wall of the tree skirt stand unit in the I-shaped tree skirt stand according to the present disclosure.

As illustrated in FIGS. 1-4, an I-shaped tree skirt stand includes a plurality of tree skirt stand units 1 that are engaged with each other. Specifically, eight groups of tree skirt stand units 1 are provided, and central angles corresponding to upper connection bars 2 and lower connection bars 3 of the tree skirt stand units 1 are all 45 degrees. However, the number of tree skirt stand units 1 is not limited to eight groups, and the product may be expanded to different numbers and groups, and specifications.

The tree skirt stand unit 1 is formed of an upper connection bar 2, a lower connection bar 3, and a vertical fixation bar 4. Upper and lower ends of the vertical fixation bar 4 are fixedly connected to middle portions of the upper connection bar 2 and the lower connection bar 3. The upper connection bar 2, the vertical fixation bar 4, and the lower connection bar 3 are arranged in an I shape. The upper connection bar 2 and the lower connection bar 3 are both arc bars.

An insertion slot 5 and an insertion member 6 are respectively fixedly connected to two ends of the upper connection bar 2 and the lower connection bar 3. The insertion slot 5 and the insertion member 6 may be engaged with each other and fixed to each other. Further, the insertion slot 5 is provided with an engagement hole 10, and an elastic engagement pierce 11 is fixedly connected to the insertion member 6. The elastic engagement member 11 and the engagement hole 10 mate with each other, such that the adjacent upper connection bars 2 are engaged with each other, and the adjacent lower connection bars 3 are engaged with each other by the collaboration between the elastic engagement member 11 and the engagement hole 10, which facilitates assembling and disassembling.

The upper connection bars 2 collaboratively form an upper fixation ring 7, the lower connection bars 3 collaboratively form a lower fixation ring 8. It should be noted that the upper fixation ring 7 has a circumference that is less than that of the lower fixation ring 8, such that the entire tree skirt stand is in a circular step-shaped structure which is larger at the upper part and smaller at the lower part. In this way, stronger stability is attained.

Side walls of both the upper connection bar 2 and the lower connection bar 3 are both provided with a tree skirt fixation member 9 for ease of fixing the tree skirt. Further, the tree skirt fixation member 9 may employ one or more of a magic tape, a hook, a magnetic tape, and a snap, but is not limited to these fixation members.

The operating principles of the present disclosure are described as follows:

During assembling of the tree skirt stand, the tree skirt stand units 1 are surrounded outside a tree, and are appropriately placed by arranging the upper connection bar 2 at the top and arranging the lower connection bar 3 at the bottom, such that the vertical fixation member 4 is approximated to the center of the tree. Subsequently, the insertion members 6 are inserted to the adjacent insertion slots 5, such that the elastic engagement member 11 and the engagement hole 10 are mated and connected to each other, thereby fixing the tree skirt stand units 1. Finally, the tree skirt is quickly deployed by using the tree skirt fixation member 9.

Described above are merely preferred embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. An I-shaped tree skirt stand, comprising a plurality of tree skirt units (1) that are engaged with each other, each tree skirt stand unit (1) being formed of an upper connection bar (2), a lower connection bar (3), and a vertical fixation bar (4), upper and lower ends of the vertical fixation bar (4) being respectively fixedly connected to middle portions of the upper connection bar (2) and the lower connection bar (3), the upper connection bar (2), the vertical fixation bar (4), and the lower connection bar (3) being arranged in an I shape, the upper connection bar (2) and the lower connection bar (3) are formed in an arc configuration, two ends of the upper connection bar (2) and two ends of the lower connection bar (3) being respectively fixedly connected to an insertion slot (5) and an insertion member (6) from one of the units, the insertion slot (5) and the insertion member (6) from the other units being engaged with each other and fixed to each other, the upper connection bars (2) collaboratively forming an upper fixation ring (7), the lower connection bars (3) collaboratively forming a lower fixation ring (8), side walls of the upper connection bar (2) and the lower connection bar (3) being both provided with a tree skirt fixation member (9).

2. The I-shaped tree skirt stand according to claim 1, wherein the tree skirt fixation member (9) is a magic tape.

3. The I-shaped tree skirt stand according to claim 1, wherein the tree skirt fixation member (9) is a hook.

4. The I-shaped tree skirt stand according to claim 1, wherein the tree skirt fixation member (9) is a magnetic tape.

5. The I-shaped tree skirt stand according to claim 1, wherein the tree skirt fixation member (9) is a snap.

6. The I-shaped tree skirt stand according to claim 1, wherein the insertion slot (5) is provided with an engagement hole (10), and an elastic engagement member (11) is fixedly connected to the insertion member (6), the elastic engagement member (11) mating with the engagement hole (10).

7. The I-shaped tree skirt stand according to claim 1, wherein the upper fixation ring (7) has a circumference that is less than that of the lower fixation ring (8).

\* \* \* \* \*